United States Patent
Kucera et al.

(10) Patent No.: US 10,528,411 B2
(45) Date of Patent: Jan. 7, 2020

(54) PROGRAMMABLE VIEWS IN THE CRASH DUMP ANALYSIS TOOL

(71) Applicant: CA, Inc., New York, NY (US)

(72) Inventors: Slavomir Kucera, Prague (CZ); Robert Skorpil, Dobrejovice (CZ)

(73) Assignee: CA, Inc., New York, NY (US)

(*) Notice: Subject to any disclaimer, the term of this patent is extended or adjusted under 35 U.S.C. 154(b) by 332 days.

(21) Appl. No.: 15/456,678

(22) Filed: Mar. 13, 2017

(65) Prior Publication Data

US 2018/0260270 A1  Sep. 13, 2018

(51) Int. Cl.
*G06F 3/00* (2006.01)
*G06F 11/07* (2006.01)
*G06F 11/32* (2006.01)

(52) U.S. Cl.
CPC ...... *G06F 11/0778* (2013.01); *G06F 11/0751* (2013.01); *G06F 11/321* (2013.01)

(58) Field of Classification Search
CPC .......... G06F 11/0778; G06F 11/0751

USPC ........................... 715/781, 792, 785
See application file for complete search history.

(56) References Cited

PUBLICATIONS

Rinehart, Martin, Notepad++ Secrets: Bookmarks, http://www.martinrinehart.com/frontend-engineering/engineers/tools/notepad-pp/bookmarks.html copyright 2012, p. 1 (Year: 2012).*
Notepad++ wiki, Managing two views in a single Notepad++, http://docs.notepad-plus-plus.org/index.php/Multiple_Views last modified May 2, 2011, p. 1 (Year: 2011).*
Superuser, Hex Editors for windows, https://superuser.com/questions/14465/hex-editors-for-windows Jul. 28, 2009, p. 1 (Year: 2009).*

* cited by examiner

*Primary Examiner* — Andrey Belousov

(57) ABSTRACT

A debug tool generates a plurality of crash dump windows configured to display a view of crash dump data. The tool hierarchically links the memory addresses of the data in different windows such that changes made to the view of the crash dump data in a parent will affect the view of the crash dump data in a child window. The relationship that links the windows is a relationship expression provided by a user. The relationship between the windows can be altered to reflect a new user-defined relationship.

17 Claims, 19 Drawing Sheets

| EXPRESSION | DESCRIPTION | EXAMPLE |
|---|---|---|
| +n, -n | A byte-offset where n is an integer representing a number of bytes. The value n is interpreted as a hexadecimal value. the "+" qualifier moves forward n bytes, and then begins displaying the crash dump data from that address, the "-" qualifier moves backward n bytes, and then begins displaying the crash dump data form that address. | +400 indicates that the memory address with which the data is displayed in the first target window remains offset from the base memory address by 400 bytes<br><br>+100? indicates a more forward 10 bytes from the base address of the base window, and then again to the 32-bit memory address that is identified at that memory location |
| %, ?, ! | Dereferencing symbol, wherein "%" refers to dereferencing a 24-bit address, "?" refers to dereferencing a 32-bit address, and "!" refers to dereferencing a 64-bit address | x2 (200) returns a 2-byte number stored at memory location 200 |
| X1(...)," "X2(...)," ... "X8(subexpression)" | Sub expressions are evaluated to identify a memory address, and return a n-byte value stored at that location. | :0 |
| :0 | References the "0" address (i.e., the base address) | :MYDATA identifies the address defined by the user |
| :<bookmark address> | Navigates the view to an address previously identified by a user | |
| $, @ | Indicates a context address | $ identifies the last memory address associated with the window receiving the command. @ identifies the memory address being the last evaluated memory address in a given expression |

*FIG. 4*

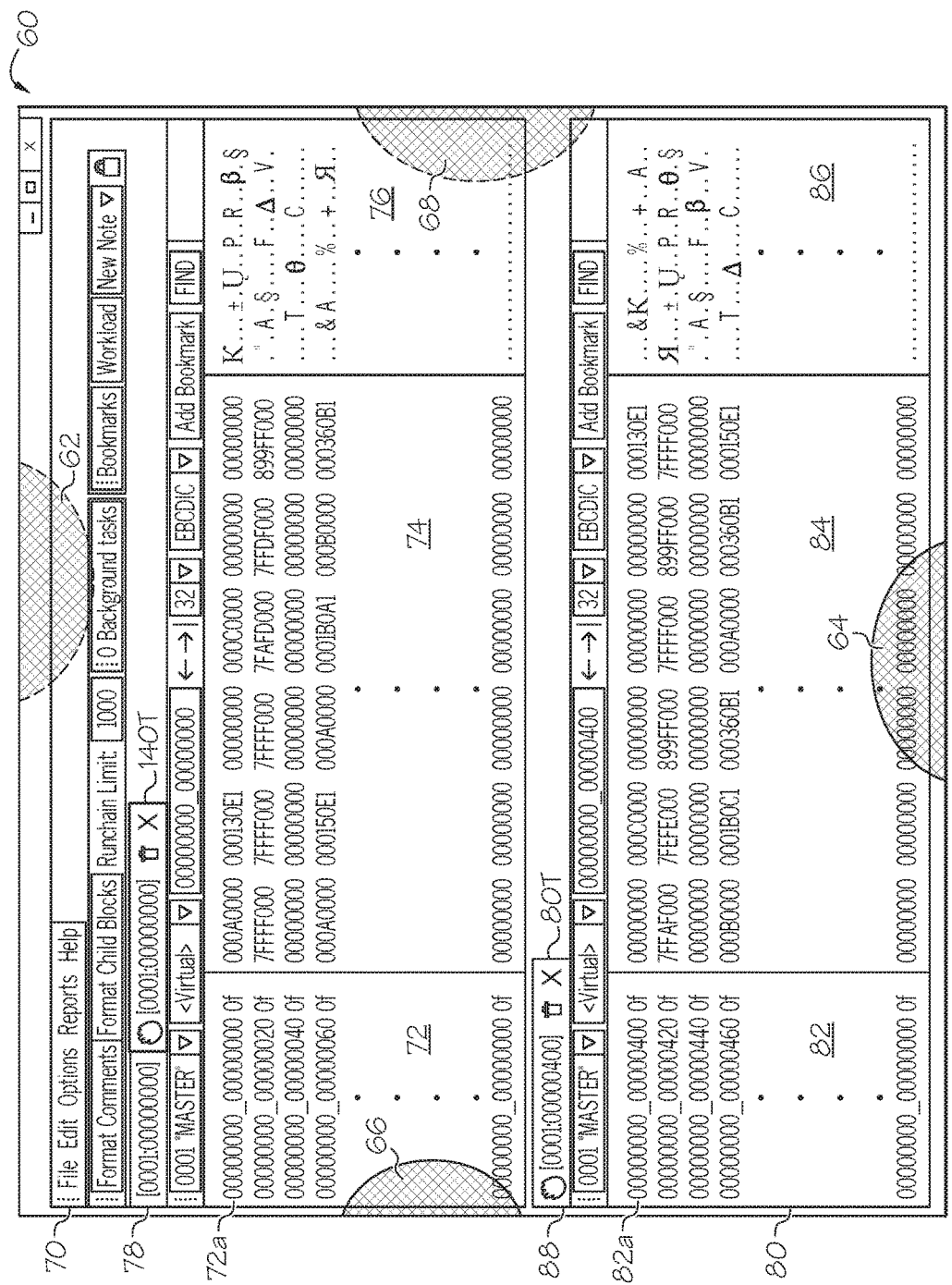

FIG. 6F

PROGRAMMABLE VIEWS IN THE CRASH DUMP ANALYSIS TOOL

BACKGROUND

The present disclosure relates generally to computer devices, and more particularly, to computer devices configured to execute debug tools for performing a crash dump analysis.

A memory dump (i.e., a "crash dump") is a process that captures a copy of the data in memory whenever the application program or system associated with that data terminates abnormally. Memory dump processes typically output the crash dump data to a display for a user, but will also save that data to one or more "dump files" for subsequent analysis. By analyzing such crash dumps, software developers, and system administrators, for example, are able to identify, diagnose, and resolve the problem or problems that caused the application program or system to fail.

BRIEF SUMMARY

In one embodiment, the present disclosure provides a computer-implemented method comprising generating a plurality of windows for display to a user, wherein the plurality of windows comprises a base window and a first target window. Each window is configured to display a corresponding view of crash dump data. The first target window is hierarchically linked to the base window in accordance with a relationship expression that defines a relationship between memory addresses of the crash dump data displayed in the base window and the first target window. The view of the crash dump data displayed in the first target window is changed in accordance with the relationship expression responsive to receiving a navigation command changing the view of the crash dump data displayed in the base window.

In one embodiment, the present disclosure provides a computer device comprising a communications interface circuit and a processing circuit operatively connected to the communications interface circuit, The communications interface circuit is configured to communicate data with a communications network. The processing circuit is configured to generate a plurality of windows for display to a user, wherein the plurality of windows comprises a base window and a first target window. Each window is configured to display a corresponding view of crash dump data. The processing circuit is also configured to hierarchically link the first target window to the base window in accordance with a relationship expression that defines a relationship between memory addresses of the crash dump data displayed in the base window and the first target window, and change the view of the crash dump data displayed in the first target window in accordance with the relationship expression responsive to receiving a navigation command changing the view of the crash dump data displayed in the base window.

In one embodiment, the present disclosure provides a non-transitory computer-readable medium comprising executable code stored thereon that, when executed by a processing circuit of a computer device, causes the computer device to generate a plurality of windows for display to a user, wherein the plurality of windows comprises a base window and a first target window. Each window is configured to display a corresponding view of crash dump data. Additionally, the executable code causes the computer device to hierarchically link the first target window to the base window in accordance with a relationship expression that defines a relationship between memory addresses of the crash dump data displayed in the base window and the first target window, and change the view of the crash dump data displayed in the first target window in accordance with the relationship expression responsive to receiving a navigation command changing the view of the crash dump data displayed in the base window.

Of course, those skilled in the art will appreciate that the present embodiments are not limited to the above contexts or examples, and will recognize additional features and advantages upon reading the following detailed description and upon viewing the accompanying drawings.

BRIEF DESCRIPTION OF THE DRAWINGS

Aspects of the present disclosure are illustrated by way of example and are not limited by the accompanying figures with like references indicating like elements.

FIGS. 3A-3G illustrate a user interface configured to display the plurality of hierarchically linked crash dump windows according to one embodiment of the present disclosure.

FIG. 4 is a table identifying some of the command expressions suitable for controlling the data displayed in the plurality of hierarchically linked crash dump windows according to one embodiment of the present disclosure.

FIGS. 6A-6G illustrate a user interface configured to display the plurality of hierarchically linked crash dump windows according to one embodiment of the present disclosure.

DETAILED DESCRIPTION

Figure 1:
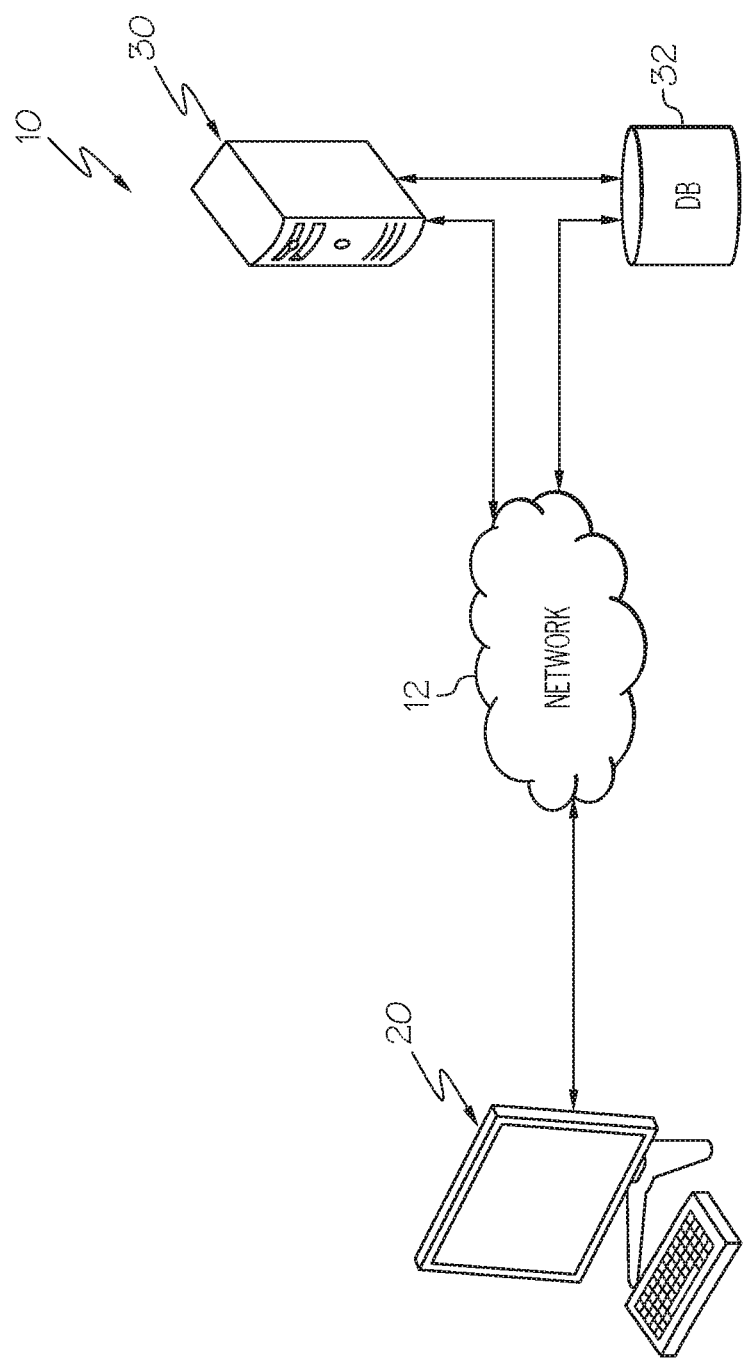
FIG. 1 is a functional block diagram of a computer system configured according to one embodiment of the present disclosure.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely as hardware, entirely as software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Turning now to the drawings, FIG. 1 is a functional block diagram illustrating a computer system 10 configured according to one embodiment of the present disclosure. System 10 comprises one or more IP networks 12, such as packet data networks, for example, communicatively interconnecting a client computer 20, an application server (AS) computer 30, and a persistent storage device (DB) 32. Although not expressly shown, other networks, network devices, and devices that connect to network 12, directly or indirectly, may be present in system 10 as needed or desired.

The AS 30 may comprise any network-based computer capable of executing application programs for end users of one or more client computers 20. By way of example only, AS 30 may execute one or more application programs that provide access to data stored in DB 32. Client computer 20 may execute an end user application (e.g., a browser application) that communicates with the application programs executing on AS 30. Specifically, using the end user application, the user can send commands to AS 30 to invoke various user interfaces (UIs) that facilitate the user viewing, adding, deleting, modifying, and otherwise manipulating the data stored on DB 32.

Sometimes, the application programs (and/or the system or computer that runs the application programs, such as AS 30) crash unexpectedly. The reason for such crashes may be unknown. Thus, to determine the root cause of a failure, software developers and/or other qualified personnel must analyze a copy of the application program data that was in memory at the time the application program terminated abnormally. This copy of the application program data is a file commonly referred to as a "crash dump" file.

To properly analyze the crash dump data, it is beneficial for users to view multiple related areas of the captured memory contents. This is because there are normally predictable relationships between the crash dump data in different areas of the crash dump file. By way of example only, the crash dump data in one part of the crash dump file may be generated or modified based on the crash dump data that is in a completely different part of the crash dump file. Conventional debug tools allow a user to view the contents of a crash dump file; however, they do not permit users to define relationships between the crash dump data in disparate areas of the crash dump file, and to subsequently view that crash dump data in the context of one or more user-defined relationships.

Embodiments of the present disclosure, therefore, configure a computer, such as client computer 20, for example, to execute a debug tool with which a user may analyze the crash dump data of a crash dump file. Particularly, the debug tool presents an interactive graphical user interface (GUI) to the user. The GUI permits the user to define hierarchical relationships between the crash dump data in different parts of the crash dump file, and subsequently control the display of that related data such that the user is able simultaneously view multiple, corresponding related portions of the crash dump data.

FIGS. 2 and 3A-3G illustrate a method 40 (FIG. 2) and corresponding GUI 60 (FIGS. 3A-3G) for generating and hierarchically linking a plurality of crash dump windows according to one embodiment of the present disclosure. It should be noted that the embodiment shown in these figures assumes that a crash has occurred, thereby terminating the application program(s) executing on AS 30 abnormally. Additionally it is assumed that a copy of the application data in memory at the time of the crash (i.e., the crash dump data) was captured and stored as a crash dump file.

Figure 2:
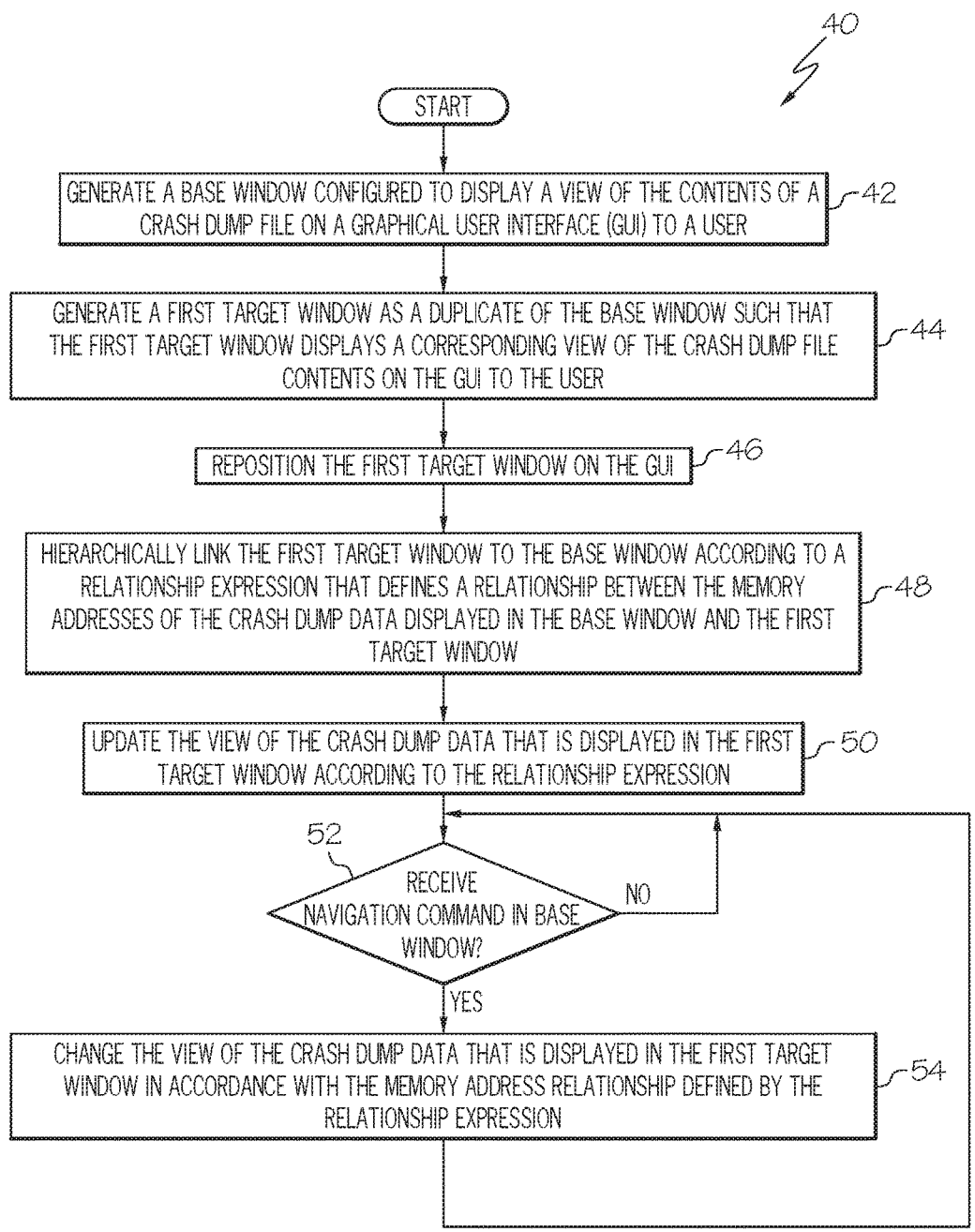
FIG. 2 is a flow diagram illustrating a method of generating and hierarchically linking a plurality of crash dump windows according to one embodiment of the present disclosure.
Figure 3A:
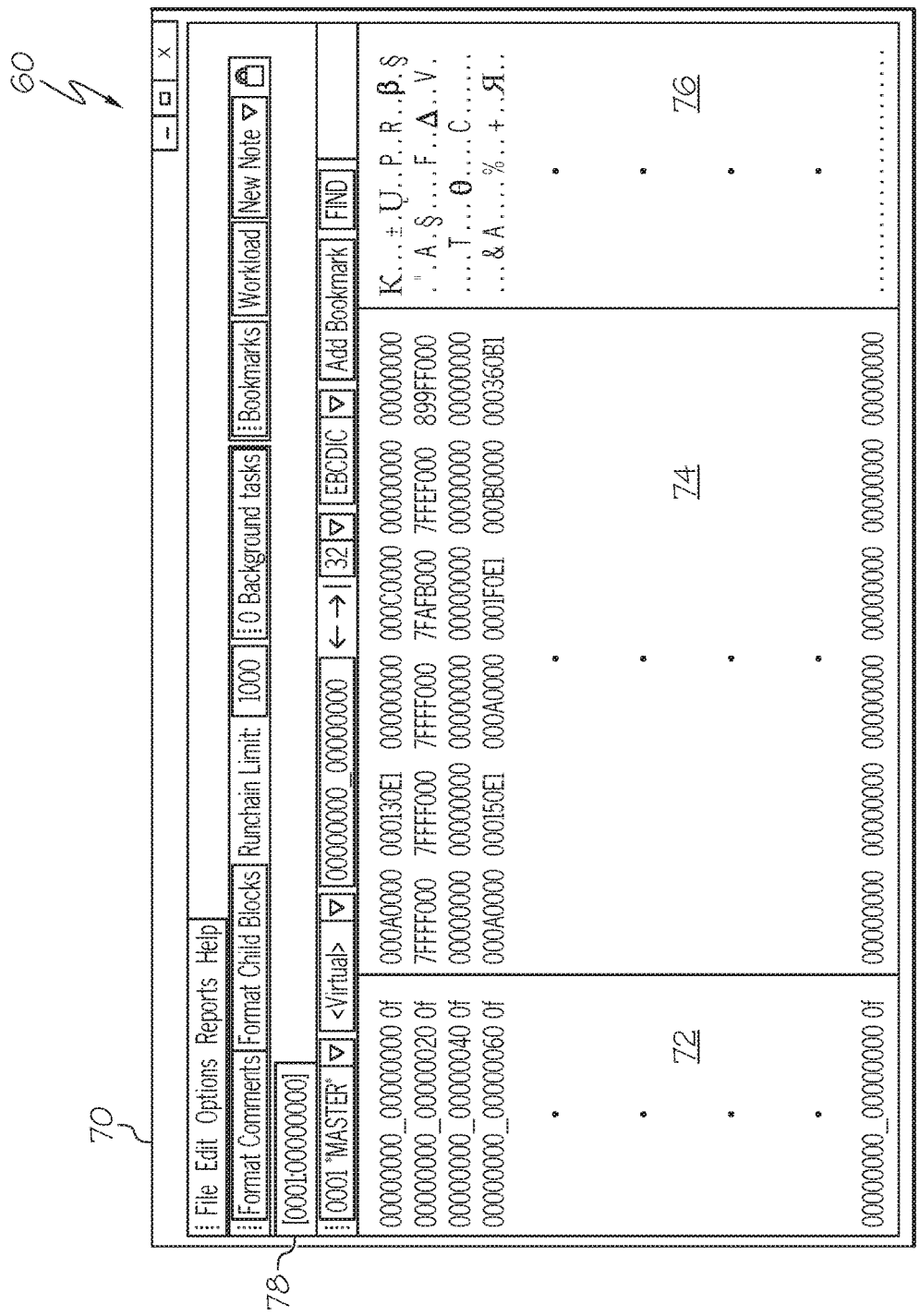
Figure 3B:
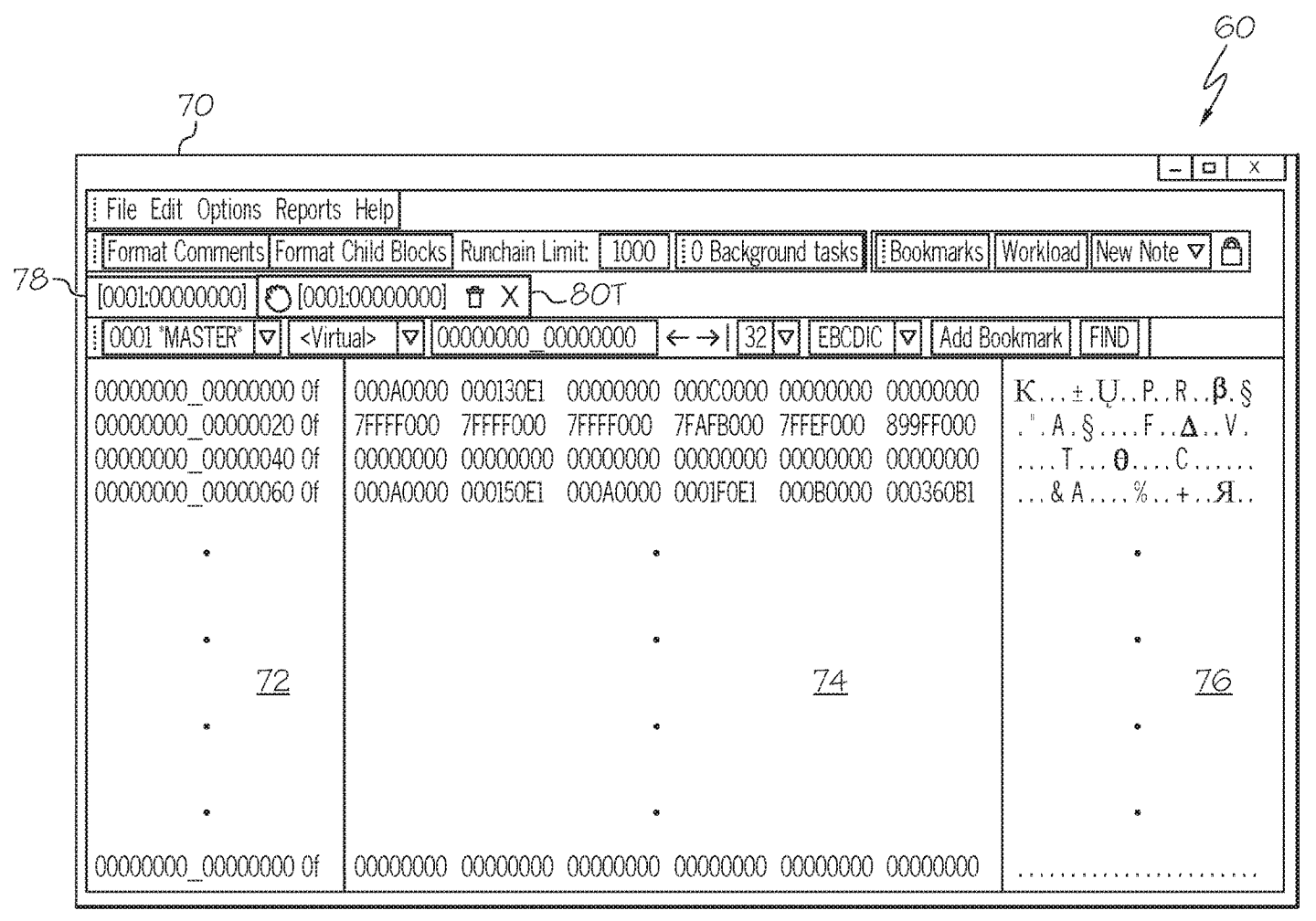

As seen in FIGS. 2 and 3A, method 40 begins with a debug application configured according to the present embodiments executing on client computer 20 providing a GUI 60 for display to the user. The debug application downloads the crash dump file into memory, and generates a base window 70 that is configured to display the contents of the crash dump file (i.e., the "crash dump data") on GUI 60 (box 42). In this embodiment, the generated base window 70 is partitioned into three sections including a data address section 72, a crash dump data section 74, and a translated data section 76. Further, a crash dump data file comprising crash dump data is obtained, and its contents displayed in the three sections 72, 74, 76.

Particularly, the data address section 72 displays the addresses of the crash dump data displayed in the crash dump data section 74. Each address in the data address section (e.g., "00000000_00000000 0f," "00000000_00000020 0f," "00000000_00000040 0f," etc.) identifies the beginning of a corresponding line of crash dump data displayed in the crash dump data section 74. Similarly, the translated data section 76 comprises the "symbol" equivalents of each byte of data (e.g., 000A0000 000130E1 . . . " etc.) displayed in the crash dump data section 74. In some cases, the various bytes of crash dump data displayed in the crash dump data section 74 are printable. Thus, a corresponding printable ASCII symbol is displayed to the user in a corresponding position of the translated data section 76. In other cases, however, the bytes of data displayed in the crash dump data section 74 are not printable. In these latter cases, a predetermined symbol or character, such as a "period," for example, may be displayed in the translated data section 76 to represent such non-printable bytes of data.

In this embodiment, both the addresses in the data address section 72 and the crash dump data in the crash dump data section 74 are displayed in hexadecimal format, while the data displayed in the translated data section 76 is displayed in ASCII format. Those of ordinary skill in the art will readily appreciate, however, that this is merely illustrative, and that the contents of each section 72, 74, 76 may be displayed in any format needed or desired.

In addition to the three different sections 72, 74, 76, the client computer 20 also generates the base window 70 to comprise a data address indicator 78. The indicator 78, which also displays address information in hexadecimal format, may be formed as a "tab" in base window 70 and identifies the base memory address of the crash dump data in the crash dump data file. As described in more detail later, the address displayed in the indicator 78 changes for each different window that is generated according to embodiments of the present disclosure.

Once the base window 70 has been generated and the contents of the crash dump data file retrieved and output for display in sections 72, 74, 76, client computer 20 generates a first target window (see FIG. 3B) for display on GUI 60 (box 44). In this embodiment, the first target window (seen later in FIGS. 3C-3G as target window 80) is generated as a duplicate of the base window 70, and thus, is generated to display, at least initially, the same crash dump data beginning from the same base data address of the crash dump data file.

Generating the first target window 80 may be performed responsive to receiving a user command. For example, the user may "right-click" anywhere in the base window 70 using a mouse device to cause GUI 60 to display a list of possible commands. The user would then select a command from the list that causes the client computer 20 to generate the first target window 80. Specifically, the command selected by the user signals client computer 20 to generate the first target window 80 as a duplicate of the base window 70, including the contents of base window 70. The newly-generated first target window is then represented on GUI 60, at least initially, as a "tab" 80T.

Figure 3C:
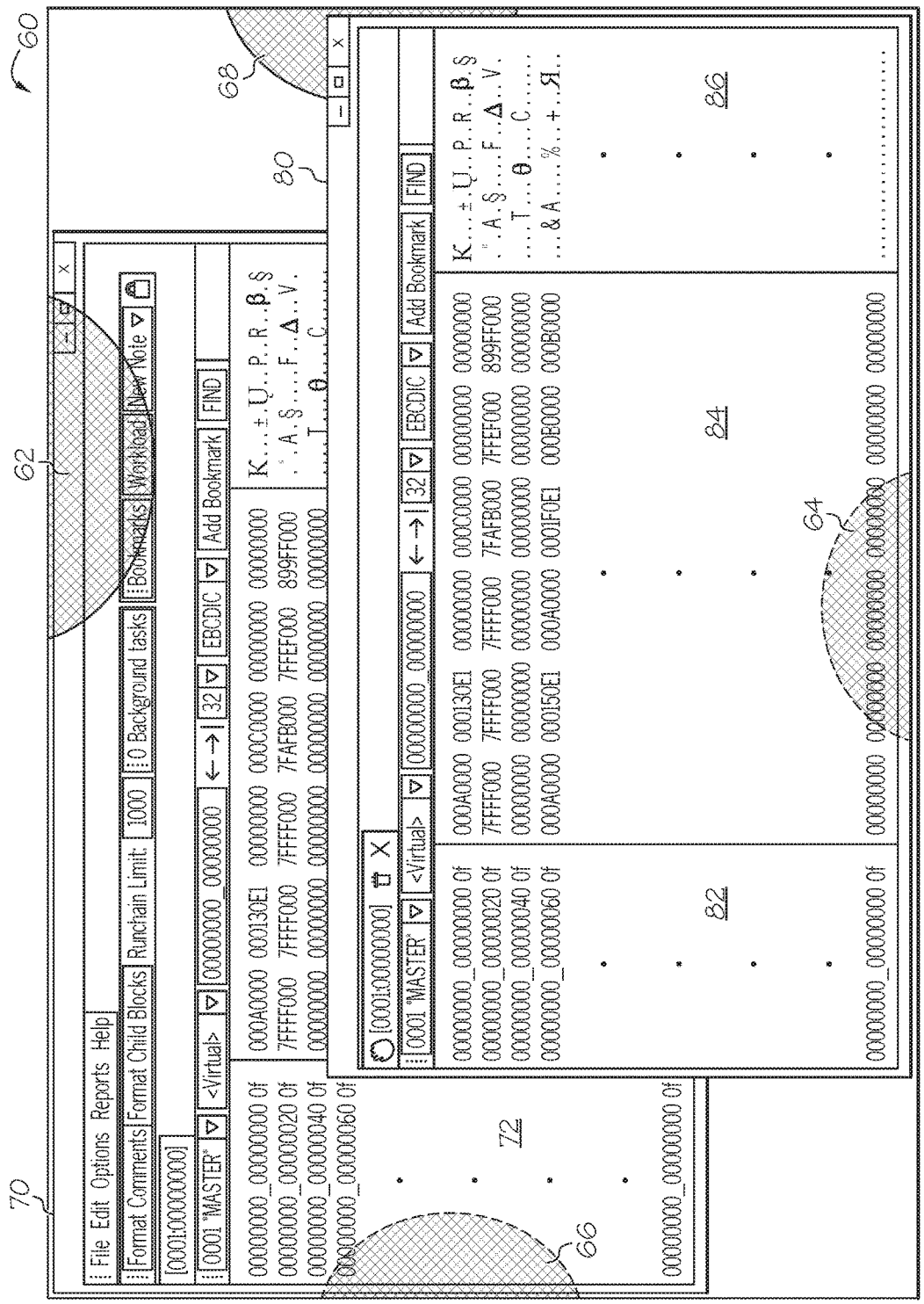

The user may then reposition the first target window 80 on the GUI 60 such that the user is able to view the crash dump data contents of both the base window 70 and the first target window 80 simultaneously (box 46), as seen in FIG. 3C. To accomplish this function, one embodiment of the present disclosure configures client computer 20 to generate and display a plurality of spaced-apart pre-defined "hot-spots" 62, 64, 66, 68 on GUI 60. Each "hot-spot," which may be visible to the user as an opaque area on GUI 60, represents a different region of GUI 60. For example, a first hot-spot 62 represents a top half of GUI 60, while a second hot-spot 64 represents the bottom-half of GUI 60. Hot-spots 66 and 68, respectively, represent the left and right halves of GUI 60.

Figure 3D:
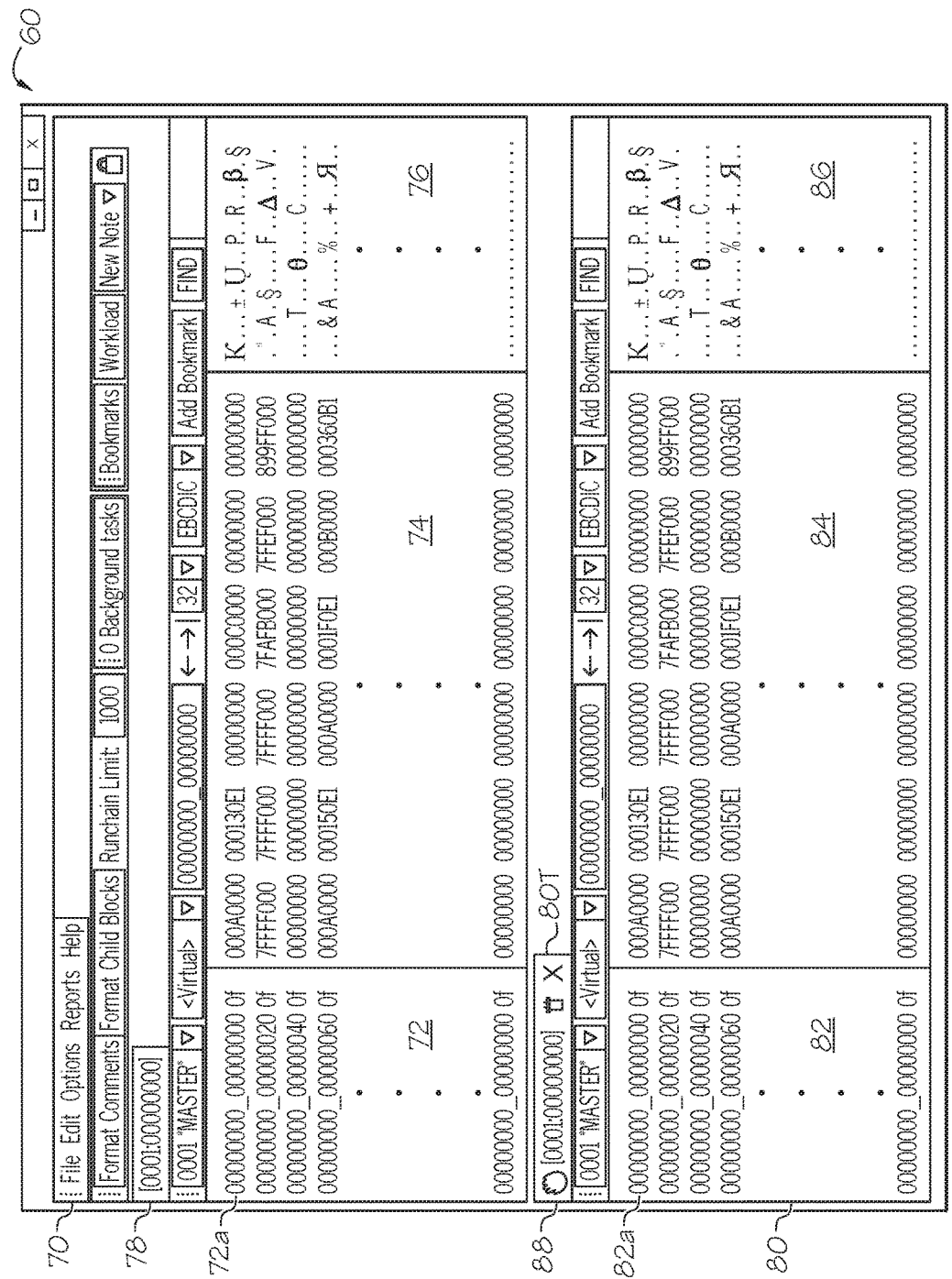

Using a mouse, the user would first "grab" the tab 80T representing the first target window 80. Responsive to detecting the user "grab" action, client computer 20 would then make the hot-spots 62, 64, 66, and 68 visible to the user on GUI 60. While continuing to "grab" the tab 80T representing the first target window 80, the user moves the tab 80T to a desired one of the hot-spots 62, 64, 66, 68 in a so-called "drag-and-drop" manner. Once the tab 80T representing the first target window 80 was positioned over a desired one of the hot-spots 62, 64, 66, 68, the user can "release" the tab 80T, typically by releasing the mouse control. This causes the client computer 20 to display the first target window 80 in the region of GUI 60 that corresponds to the selected hot-spot 62, 64, 66, 68. For example, the embodiment of FIG. 3D illustrates the visual arrangement of the base window 70 and the first target window 80 in GUI 60 responsive to the user dragging-and-dropping the tab 80T resenting the first target window 80 to hot-spot 64.

Regardless of the particular positioning of the first target window 80 on GUI 60, however, the first target window 80, as stated above, is generated as a duplicate of the base window 70. Thus, first target window 80 also comprises its own data address section 82, crash dump data section 84, translated data section 86, and address indicator 88 on tab 80T, each of which functions to display their respective data in a manner that is similar to that of base window 70. Because the two windows 70, 80 are duplicates of each other, the data in the first target window 80 is initially the same as that displayed in base window 70. Thus, as seen in FIG. 3D, for example, the first data address 72a of base window 70 is the same as the first data address 82a of the first target window 80. Similarly, the crash dump data and translated data in sections 84, 86 are the same as their respective sections 74, 76 in base window 70. Further, the addresses shown in indicators 78, 88 are also initially identical.

However, as previously stated, the present embodiments allow a user to define a hierarchical relationship between the crash data in two different areas of the crash dump file. That is, the user hierarchically links the first target window 80 to the base window 70 such that any actions performed by the user to update the crash dump data displayed in the base window 70 will also affect the crash dump data displayed in the first target window 80. However, as described in more detail below, the reverse need not be true. That is, changes to the display of the crash dump data in the first target window 80 need not be propagated to affect the display of crash dump data in the base window 70.

To accomplish this, one embodiment configures the client computer 20 to hierarchically link the first target window 80 to the base window 70 according to a user-provided relationship expression (box 48). The relationship expression provided by the user defines a relationship (i.e., "links") between the beginning data address 72a of the crash dump data in the base window 70 and the beginning data address 82a of the first target window 80.

Figure 3E:
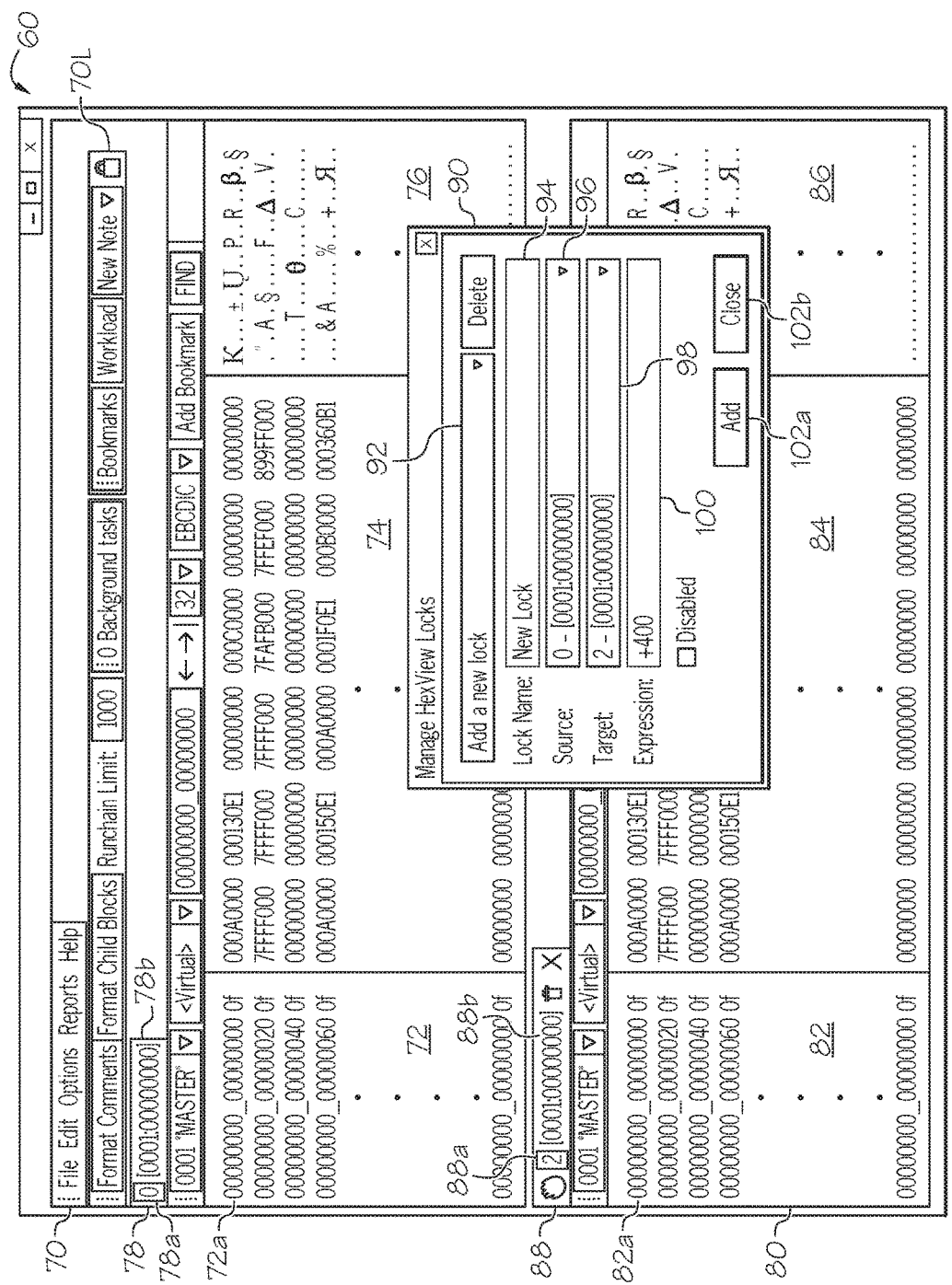

FIG. 3E graphically illustrates the process of linking the crash dump data addresses 72a, 82a according to one embodiment. Particularly, the user first selects a control 70L on base window 70. This action causes a dialog window 90 to be displayed on GUI 60. Dialog window 90, as seen in the embodiment of FIG. 3E, comprises a command field 92, a name field 94, a source identifier 96, a target identifier 98, and a relationship expression (RE) field 100 for the user to enter a relationship expression defining the relationship (i.e., the link) between the base and first target windows 70, 80.

The user in this embodiment first selects "Add a New Lock" from the drop-down list of commands in command field 92, and, optionally, enters a new name for the link in name field 94. Then the user identifies which of the base and first target windows 70, 80 is the "source" (i.e., parent) window, and which of the base and first target windows 70, 80 is the "target" (i.e., child) window. In this case, the source and target windows are identified by a generated window identifier 78a, 88a, and a corresponding data address 78b, 88b. Particularly, the source identifier 96 (i.e., '0-[0001: 00000000]') matches the ID 78a, 78b of base window 70, while the target identifier 98 (i.e., '2'-[0001:00000000]') matches the ID 88a, 88b of the first target window 80. Thus, the base window 70 is defined as the so-called "parent" window, and the first target window 80 is defined as the "so-called" child window that is hierarchically linked to the base window 70.

Once the source and target window hierarchy is defined, the user may provide a predefined expression in the RE field 100 to define the relationship that will exist between the two windows. FIG. 4 is a table illustrating some valid relationship expressions and their meanings suitable for use in embodiments of the present disclosure.

As seen in FIG. 4, the user can specify a memory offset for a child window as "+n" or "−n," where n is an integer value that defines the offset in bytes. The "+" qualifier indicates a "positive" offset from a base memory address. Thus, a relationship expression of "+400" would cause the view in a child window to move forward through the addresses 400 bytes (hex) from a base address in the parent window, and then begin displaying data from that address. The "−" qualifier indicates a "negative" offset from the base address. Accordingly, a relationship expression of "−400" would cause the view in a child window to move backward from the base address in the parent window 400 bytes (hex), and begin displaying data from that address. Regardless of the specified memory offset value, the address from which the child window begins to display the crash dump data will always remain offset from the base address of its parent window by the specified +n or −n bytes (hex) as the user navigates forwards and backwards through the crash dump data displayed in its parent window.

Additionally, or alternatively, the user may specify a relationship expression referred to herein as a "dereferencing" expression. Dereferencing expressions define a relationship in which the view of the child window begins at an address that is specified at a user-provided offset from the parent window. To handle the various address lengths (e.g., 24, 32, and 64-bit addresses), this embodiment provides several different dereferencing symbols. Particularly, as seen in FIG. 4, the "%" symbol refers to dereferencing a 24-bit address, while the "?" and "!" symbols refer to dereferencing a 32-bit address, and a 64-bit address, respectively.

As an example, the user may enter the relationship expression "+100?". Entering this expression causes the view of the child window to first move forward through the memory addresses 100 bytes (hex) from the base memory address in the parent window, read a 32-bit address that is stored at that location, and then move to that 32-bit address. The child window would then begin displaying the crash dump data beginning from that 32-bit address. Each time the user advances forwards or backwards through the memory addresses in the parent window, the child window will maintain the "+100?" (or other specified) by moving through its addresses in accordance with the specified expression.

Further, embodiments of the present disclosure also allow the user to specify one or more "sub-expressions" in a relationship expression. A subexpression, which can be of the form Xn(subexpression), controls the computer executing the present embodiment to read and return a n-byte value located at the address specified by the subexpression. For example, consider a subexpression of "x2(200)". This subexpression returns a 2-byte value (indicated by the "x2") stored at memory address "200."

In addition, the present embodiments also allow for a user to define more complex subexpressions using other valid commands and expressions. For example, consider the expression "+10+x2(200)". This particular subexpression would cause the child window to move forward through the memory addresses twice. More particularly, the child window would move forward from the base memory address in the parent window by 10 bytes (hex) to a first memory address, as indicated by the "+10." Then, the child window would move forward once again from the first memory address by the number of bytes that is identified by the 2-byte value stored at memory address "200."

Another useful command is the ":0" command. Entering this command will cause the window receiving the command (i.e., the window having focus) to reference the base address of the parent window. That is, the view of the window will change to display the crash dump data beginning from the base address.

The present embodiments also provide the user with an option to bookmark a particular memory address. This command controls the computer executing the present embodiments of the disclosure to record a specified memory address and associate that address with a user-defined label.

Thereafter, whenever the user enters that label, the view of the window will navigate to the associated memory address.

For example, a user may associate the label "MYDATA" with the memory address "0001:0000FFFF." Whenever the user wishes to navigate the parent window, for example, to that memory address, the user needs only to enter the label "MYDATA." The view in the parent window would then change to begin displaying the crash dump data beginning at memory address 0001:0000FFFF. Of course, the views of any child windows of the parent window would also change in accordance with any previously user-defined relationship expression(s) relating those windows.

Further, the present embodiments also allow a user to indicate a "context" memory address. Context symbols function like variables and may be used, for example, in a subexpression. Different symbols have different "contexts" with respect to the window receiving the command, and thus, will control the computer to change the view of that window accordingly.

One such context symbol—"$"—refers to the memory address associated with the window receiving the command. For example, consider a window receiving the command that is associated with memory address 0000:0000. If the subexpression "+10+x2($+200)" was entered into a command field of that window, the memory address of that window would first move forward 10 bytes from the base address of its parent window, and then again by the 2-byte value identified at memory address 0000:0000+200 (i.e., 0000:02C0).

Another symbol provided by the present embodiments is the "@" symbol. The "@" symbol identifies an address value equivalent to the last evaluated address in an expression. For example, consider the following subexpression "+10+x2(@+200)+x4(@+300)." The first "@" symbol refers to the evaluated memory address +200, while the second "@" symbol refers to the evaluated memory address "+10+x2(@+200)". Thus, the computer executing the present embodiments will first evaluate the expression, substituting the actual evaluated memory address values for the "@" symbols, and then change its view to begin displaying the crash dump data beginning at the resultant memory address. As above, any child windows will also alter their views of the crash dump data in accordance with the particular user-defined relationship expression for those windows.

There are many different relationship expressions from which a user can select, and those of FIG. 4 are merely illustrative. However, in this case, the user entered "+400" to indicate that the crash dump data displayed in the first target window will be +400 bytes ahead of the crash dump data displayed in the base window 70. Once defined, the user can set the link by clicking on the "ADD" button 102a, or cancel the link by clicking on the "CLOSE" button 102b. The base window 70 and the first target window 80, and more specifically, the initial crash dump data addresses 72a, 82a, are now hierarchically linked.

Figure 3F:
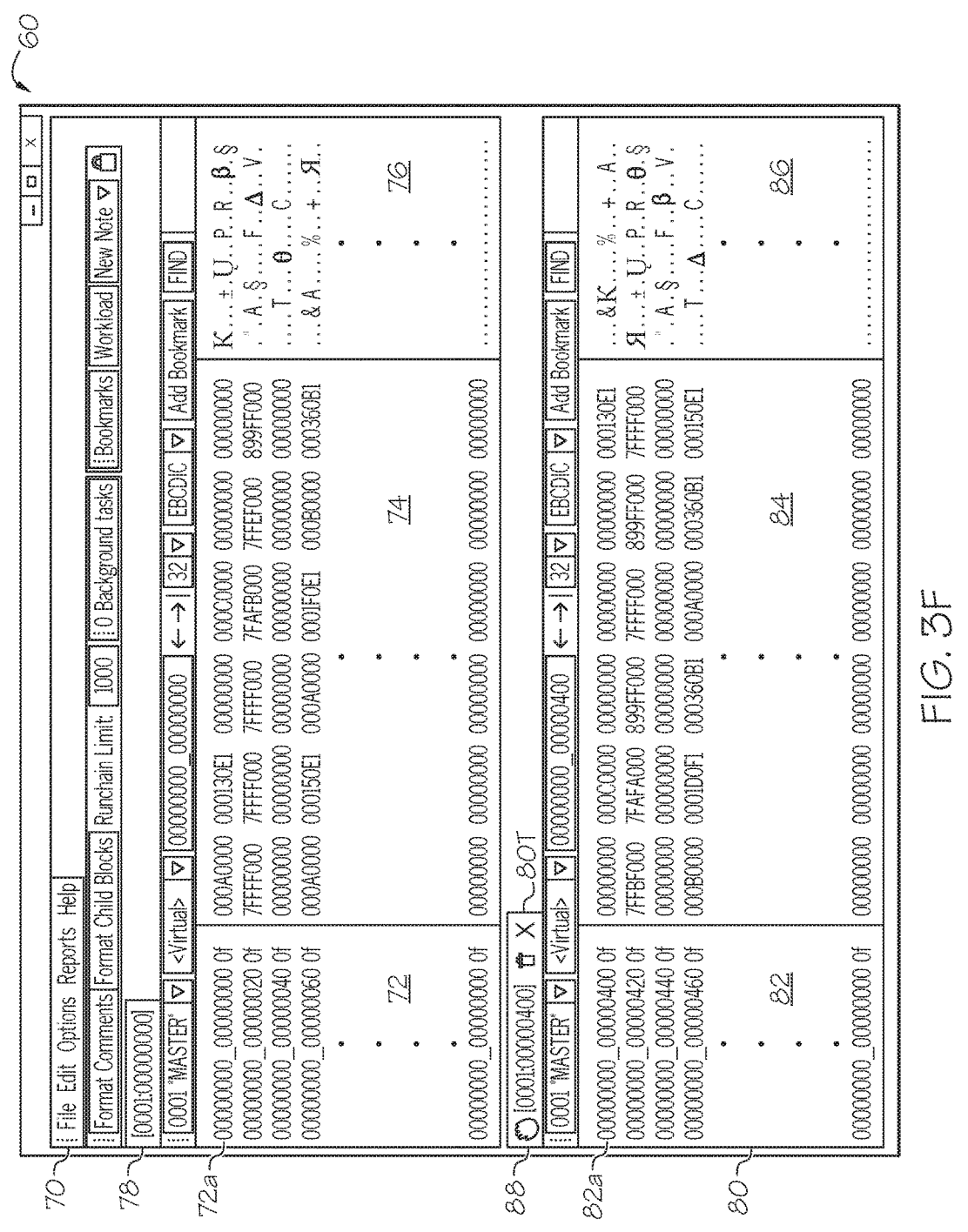

Particularly, the view of the crash dump data in the first target window 80 is updated according to the relationship expression entered by the user into the RE field 100 (box 50). As seen in FIG. 3F, for example, the data address 72a in base window 70 remains at "00000000_00000000 0f." So, too, do the rest of the memory addresses in address section 72. The data address 82a in the first target window 80, however, has changed to reflect the new user-defined hierarchical link, and thus, now reflects address "00000000_00000400 0f." Similarly, the rest of the addresses in section 82 have all increased +400. Additionally, the corresponding crash dump data and translated data in sections 84, 86 are updated to reflect the crash dump data beginning at address 00000000_00000400 0f, while the crash dump data and translated data in sections 74, 76 remain unchanged.

Figure 3G:
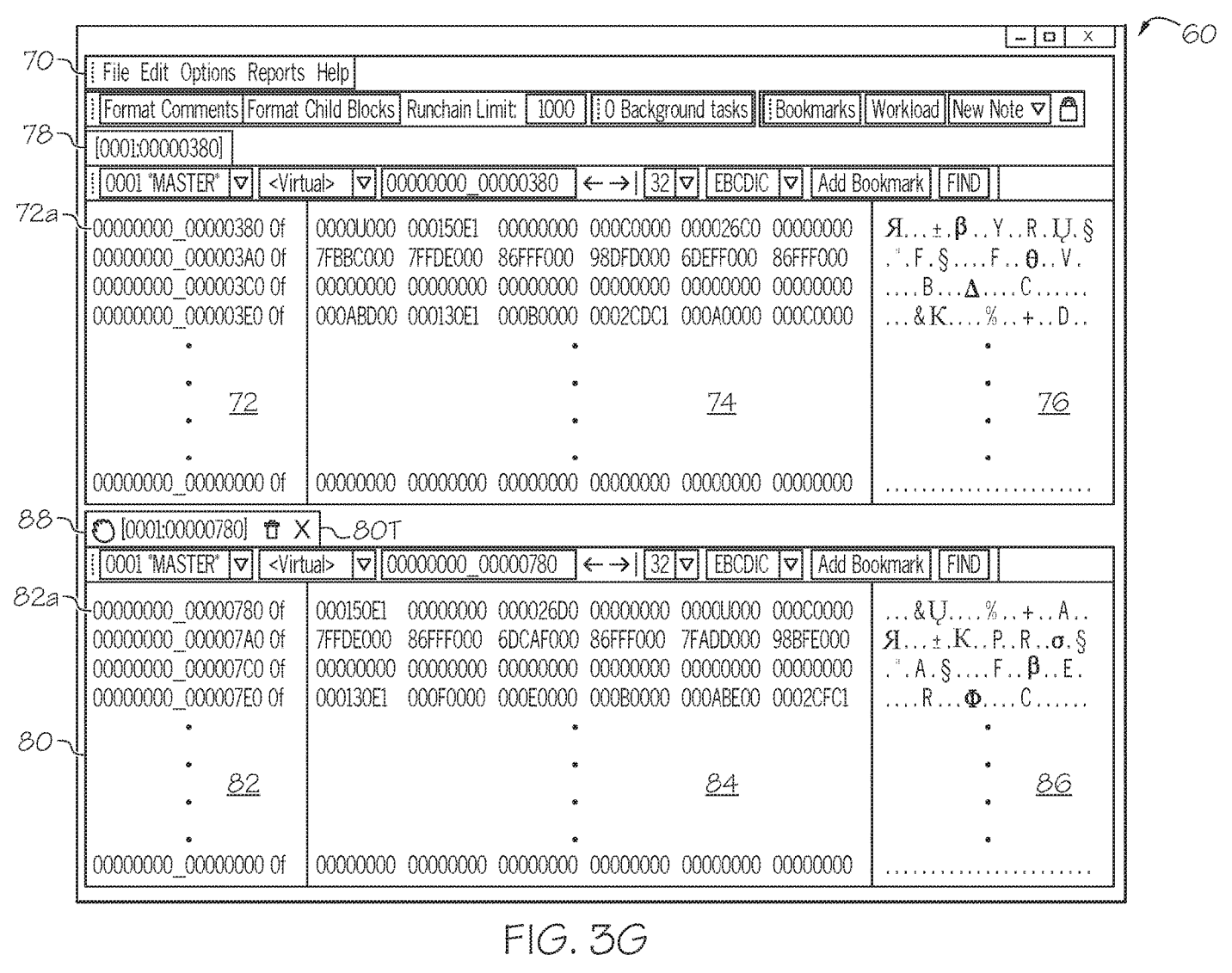

Thereafter, the client computer 20 waits to receive indications that the user has entered a navigation command into the base window 70 (box 52). Whenever the user changes the view of the data in base window 70, corresponding changes are made to the view of the data in the first target window 80 (box 54). For example, as seen in FIG. 3G, a user change incrementing the memory addresses in address section 72 of base window 70 (e.g., see address 72a changing from "00000000_00000000 0f" to "00000000_00000380 0f") results in a corresponding change to the memory addresses in memory address section 82 in first target window 80 (e.g., see address 82a changing from "00000000_00000400 0f" to "00000000_00000780 0f"). The difference between the two addresses 72a, 82a is the user-defined +400 byte offset between the memory addresses in sections 72, 82. Similarly, the data seen in sections 74, 76, 84, 86 is also updated accordingly.

The present embodiments are not limited to generating and hierarchically linking two windows. Rather, the present embodiments allow the user to generate and hierarchically link more than two windows. Further, such additional windows may be linked to the base window 72 or to the first target window 82 as a so-called "child" window such that the changes in the "parent" window 72, 82 are propagated to the additional "child" windows.

Figure 5:
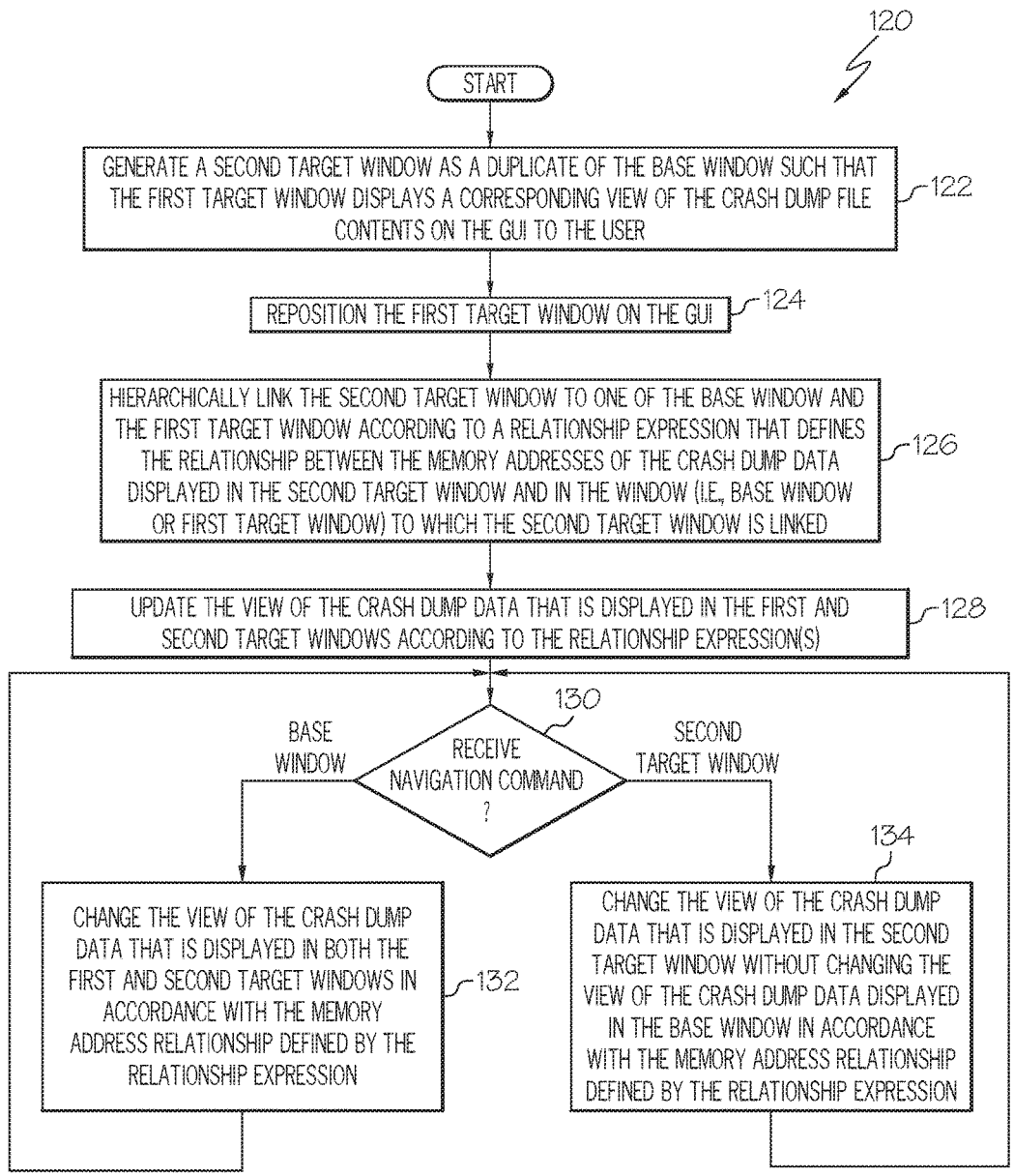
FIG. 5 is a flow diagram illustrating a method of generating and hierarchically linking additional crash dump windows according to one embodiment of the present disclosure.

FIG. 5 illustrates a method 120 for generating and hierarchically linking more than two windows, while FIGS. 6A-6G illustrate the GUI 60 in accordance with the embodiment of FIG. 5. It should be understood that the embodiments described in these figures assume that the user has already generated and hierarchically linked the base window 70 and the first target window 80. Further, the figures show the addition of only one additional window; however, those of ordinary skill in the art will appreciate that the present embodiments may be utilized to allow a user to generate and hierarchically link any number of additional windows.

Figure 6B:
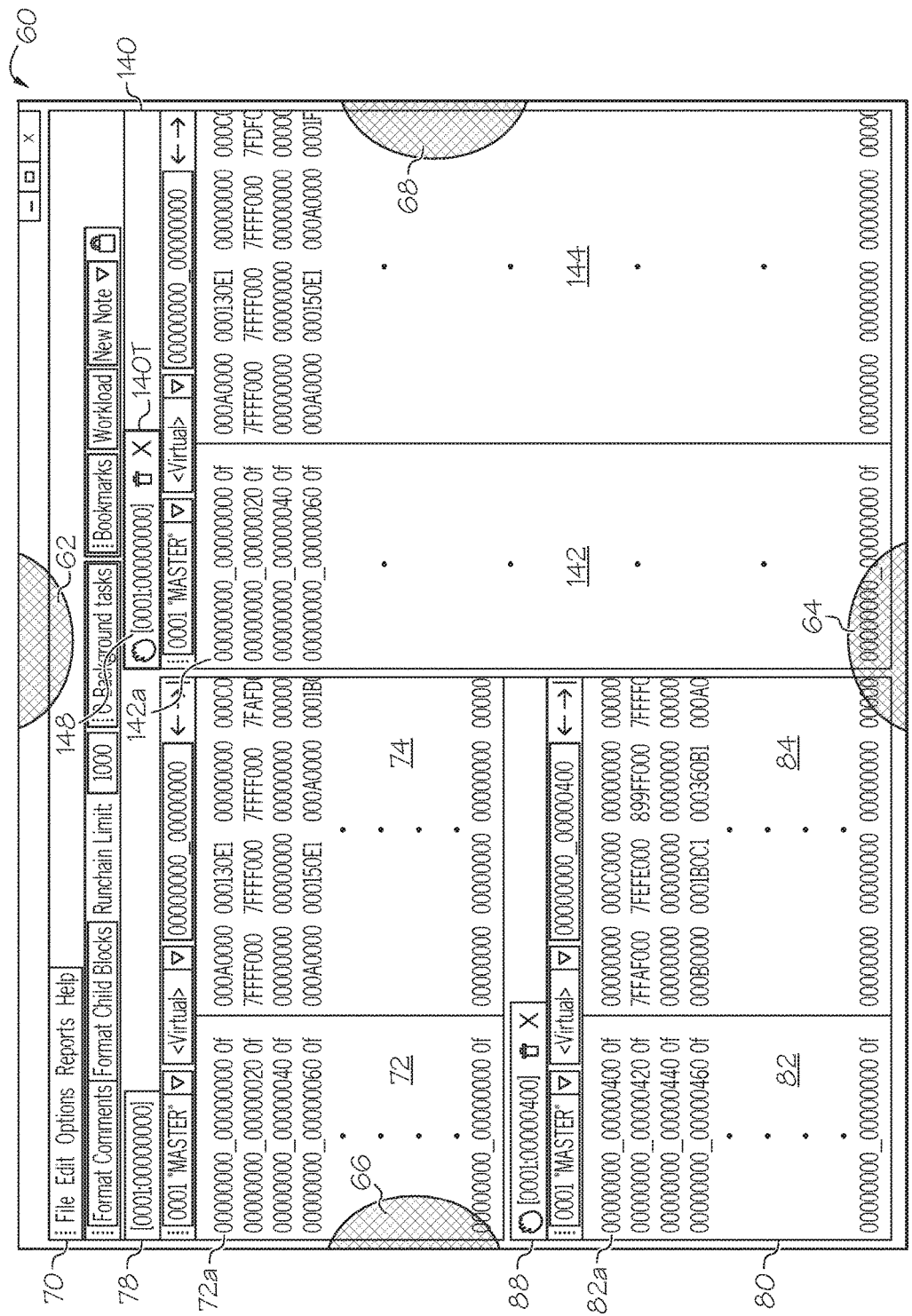

As seen in FIG. 5 and FIGS. 6A-6B, method 120 begins with the user generating a second target window 140 (box 122). As above, the second target window may be generated in the same manner that was used to generate the first target window 80. Further, the second target window 140 may be generated as a duplicate of either the base window 70 or the first target window 80. However, for ease of discussion only, the second target window 140 of this embodiment is generated as a duplicate of the base window 70.

The second target window 140 is also presented initially as a "tab" 140T on the base window 70. However, the user can reposition the second target window 140 on GUI 60 using the same "drag-and-drop" action previously described (box 124). Particularly, the user "grabs" the tab 140T representing the second target window 140 using a mouse and drags tab 140T over to hot-spot 68. Responsive to detecting that the user "drops" the tab 140T in the area of hot-spot 68, client computer 20 positions the second target window 140 on the right side of GUI 60 (see FIG. 6B). Simultaneously with positioning the second target window 140, the client computer 20 automatically re-sizes and re-positions base window 70 and the first target window 80 to accommodate the size and shape of the second target window 140. Of course, a user can resize and reshape any of the windows 70, 80, 140 at any time using the functionality inherent with these windows 70, 80, 140.

As seen in FIG. 6B, the second target window 140 also has a memory address section 142, a crash dump data section 144, a translated data section (not shown), and an address indicator 148. The initial memory address of the crash dump data displayed in section 144 is memory address 142a. Each of these components is similar to their counterpart components described previously; however, it should be noted that the memory addresses in sections 72 and 142, as well as the contents of the crash dump data in sections 74 and 144, are the same. This is because the second target window 140 was generated as a duplicate of the base window 70.

Figure 6C:
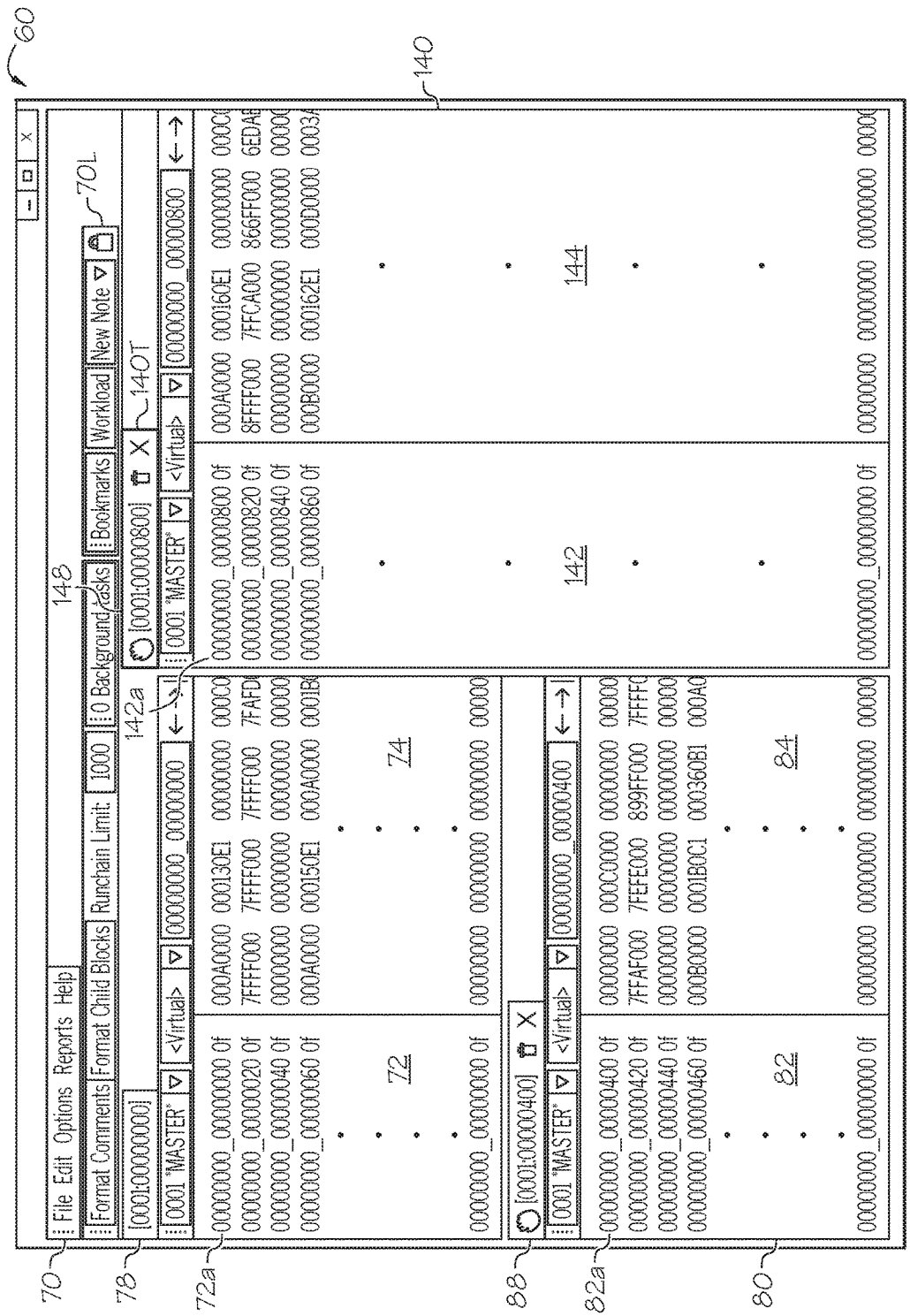

FIG. 6C illustrates GUI 60 once the user has hierarchically linked the second generated window 140 to the base window 70 (box 126). Particularly, as previously described, the user hierarchically linked the memory addresses in the base window 70 and second target window 140 by invoking dialog window 90, and defining the source window (i.e., "parent" window) as the base window 70, the target window (i.e., the "child" window) as the second target window 140, and the relationship expression that defines how the two windows 70, 140 are linked.

In this case, the user entered "+800" into the RE field 100 when hierarchically linking the second target window 140 to base window 70. Therefore, as seen in the address indicator 148, the crash dump data that is displayed in section 144 begins at an initial memory address 142a that is +800 bytes offset from the initial memory address 72a of its "parent" base window 70. The initial memory address 82a of the crash dump data displayed in section 84 of the first target window 80, however, remains at +400 in accordance with the previously user-defined relationship for its "parent" base window 70. Thus, the view of the crash dump data in the first and second target windows 80, 140 is updated according to their respective "parent-child" relationships with base window 70 (box 128).

Figure 6D:
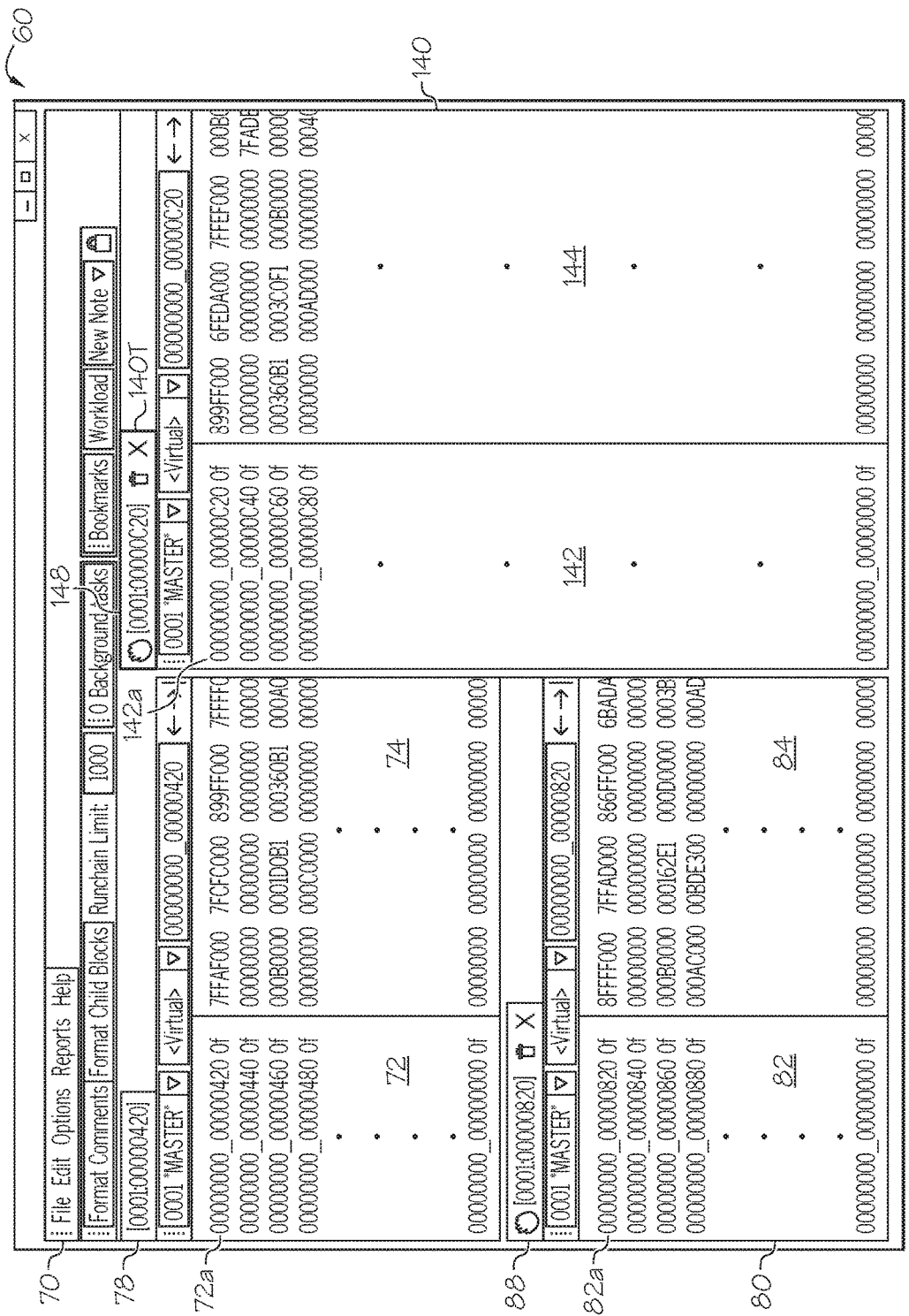

Thereafter, as seen in FIG. 6D, the user may enter "navigation commands" in a selected one of the windows 70, 80, 140 to move or scroll forward and backward through the memory addresses displayed in the respective section 72, 82, 142 of the selected window. For example, navigation commands entered with respect to the base window 70 (box 130) not only update the memory addresses and crash dump data in sections 72 and 74, but also update the memory addresses and crash dump data in sections 82, 142, 84, and 144 in accordance with their respective user-defined "parent-child" relationships (box 132). However, navigation commands entered into one of the so-called "child" windows (e.g., second target window 140) affect only the memory addresses and corresponding crash dump data in the sections (e.g., sections 142, 144) for that particular window. The navigation commands of that "child" window are not propagated to its "parent" base window 70, or to any of its sibling windows (box 134).

Figure 6E:
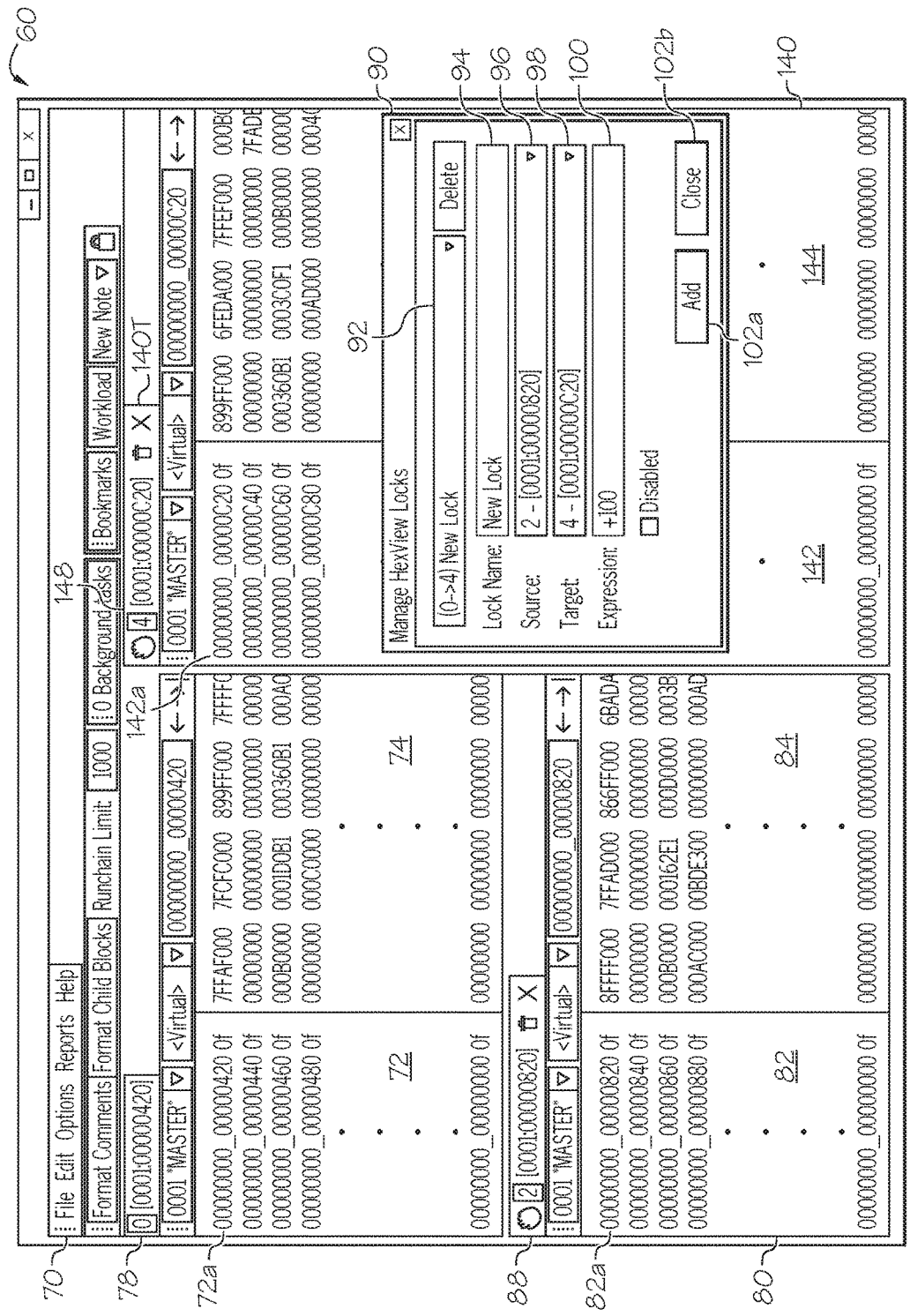

In some situations a user may wish to change or switch the hierarchical relationships that have already been defined between two windows to reflect another, different hierarchical relationship. FIG. 6E illustrates GUI 60 responsive to such switching.

As seen in FIG. 6E, the user would first invoke the dialog window 90. However, instead of generating a new target window, the user would select a current relationship from drop-down list 92 to redefine. In this case, the user has selected to redefine the hierarchical relationship between the base window 70 and the second target window 140. Once selected, the user redefines the source window to be the first target window 80 (i.e., 2-[0001:00000820]), identifies the target window as the second target window 140 (i.e., 4-0001:00000C20]), and enters the relationship expression that will define the new hierarchical relationship between the first and second target windows 80, 140. In this case, as seen in FIG. 6E, the relationship is defined by the user as being a +100 byte offset between the memory addresses displayed in sections 82, 142.

Figure 6F:
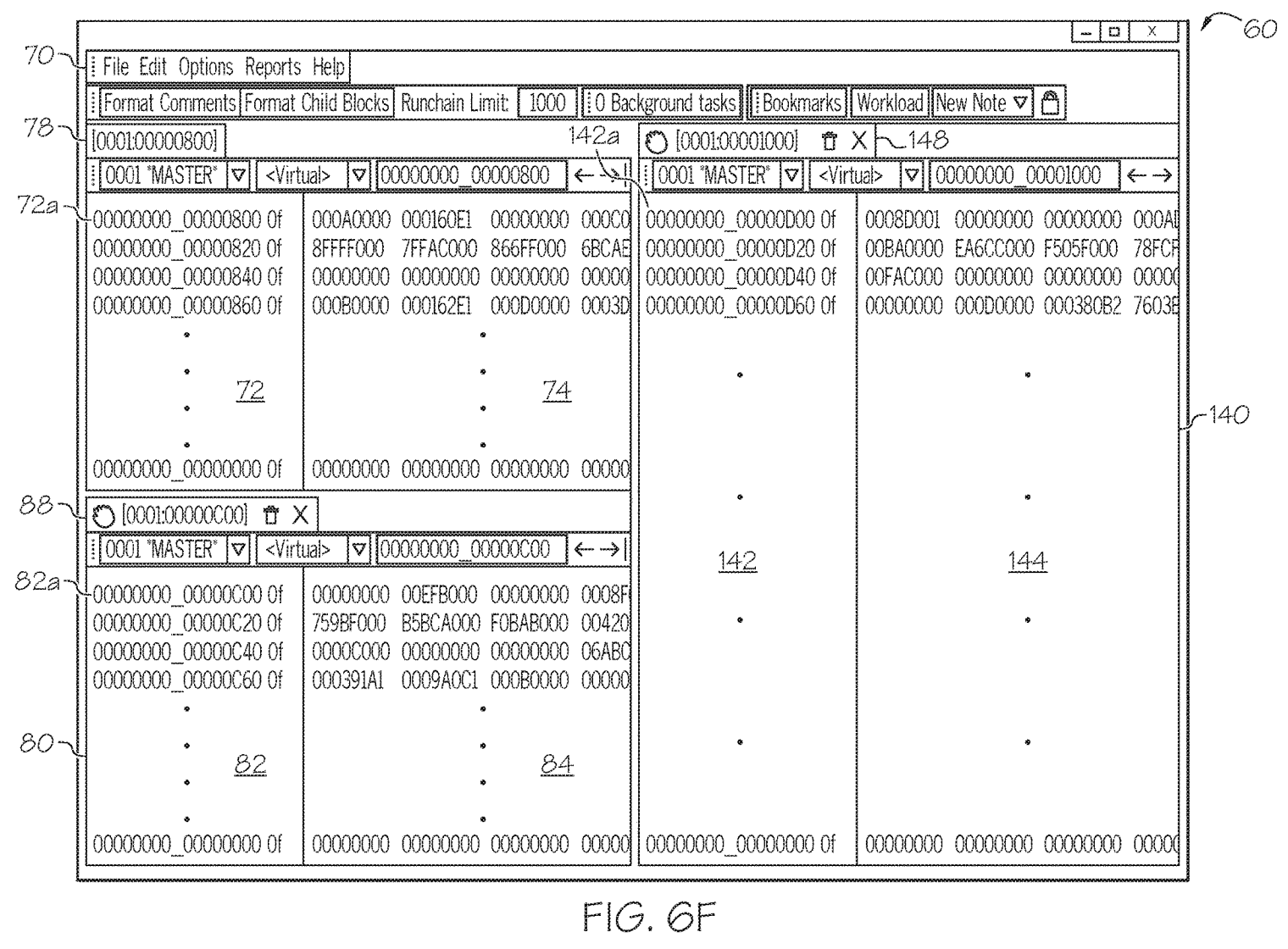

This user-defined relationship between the memory addresses in windows 70, 80, 140 effectively "chains" the windows into a "grandparent-parent-child" relationship. Thus, as seen in FIG. 6F, navigation commands entered with respect to the base window 70 will affect the views in the first and second target windows 80, 140 in accordance with their respectively defined hierarchical relationships. Particularly, navigation commands entered with respect to the base window 70 will affect the view in the first target window 80 by maintaining a +400 byte offset between the memory addresses in sections 72 and 82. However, the view in the second target window 140 will reflect a +100 byte offset between the memory addresses in sections 82 and 142 of the first and second target windows 80, 140.

Figure 6G:
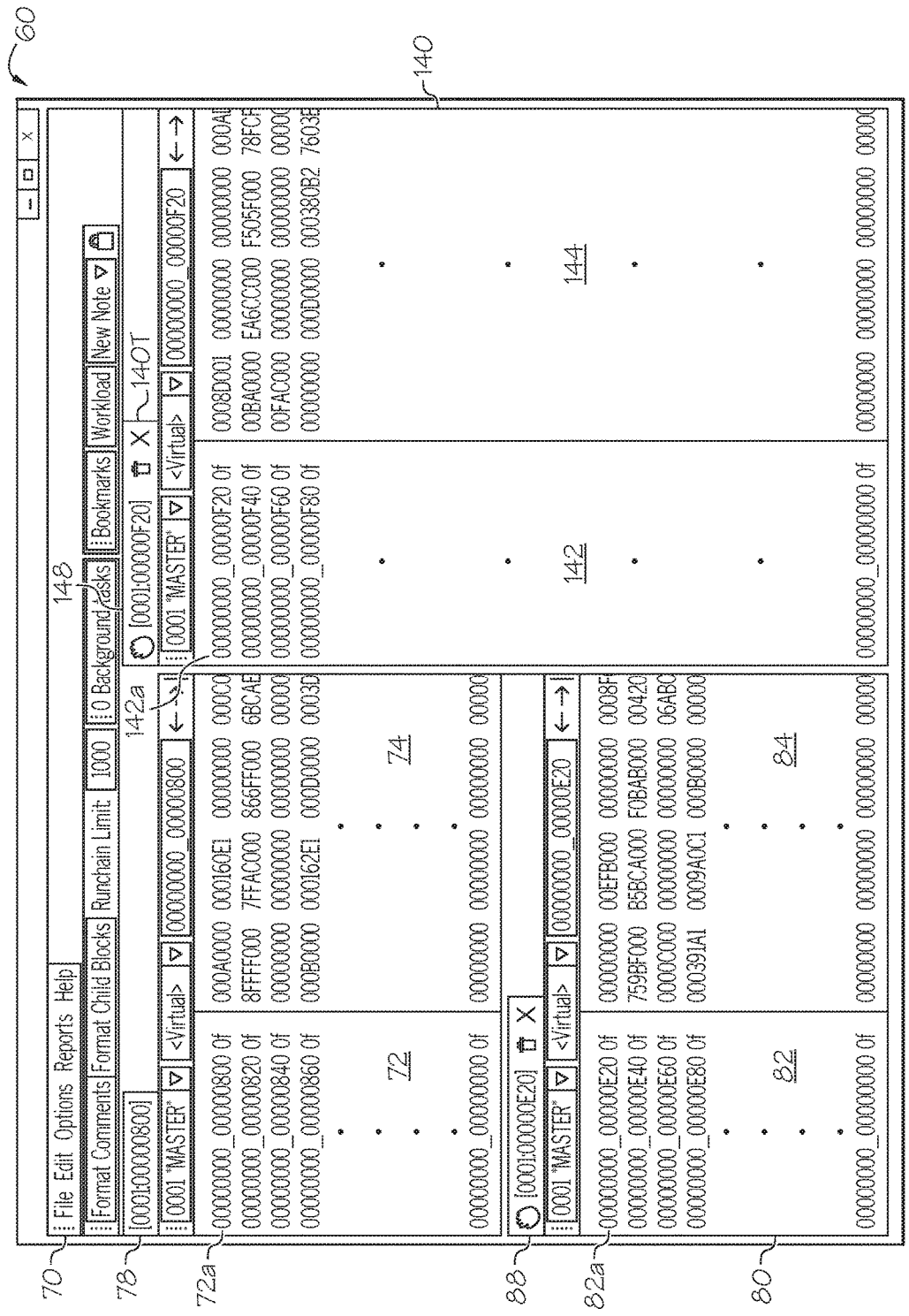

Similarly, as seen in FIG. 6G, navigation commands received at GUI 60 with respect to the first target window 80 will affect the view of the crash dump data in the second target window 140 in accordance with the user-defined +100 byte offset, but will not affect the view of the crash dump data in the base window 70. Navigation commands received with respect to the second target window 140 will only affect the view of the crash dump data in the second target window 140 without altering the view of the crash dump data in either of the base window 70 and the first target window 80.

Those of ordinary skill in the art should understand that the previously described embodiments are illustrative only. Thus, although the previous embodiments describe the hierarchical relationships as facilitating changing crash dump data views in one or more "child" windows based on navigational commands entered in a "parent" window, the reverse is also possible with some embodiments of the present disclosure. That is, users may define a relationship between two windows in which the data views of a parent window change responsive to navigational commands entered with respect to a child window.

Figure 7:
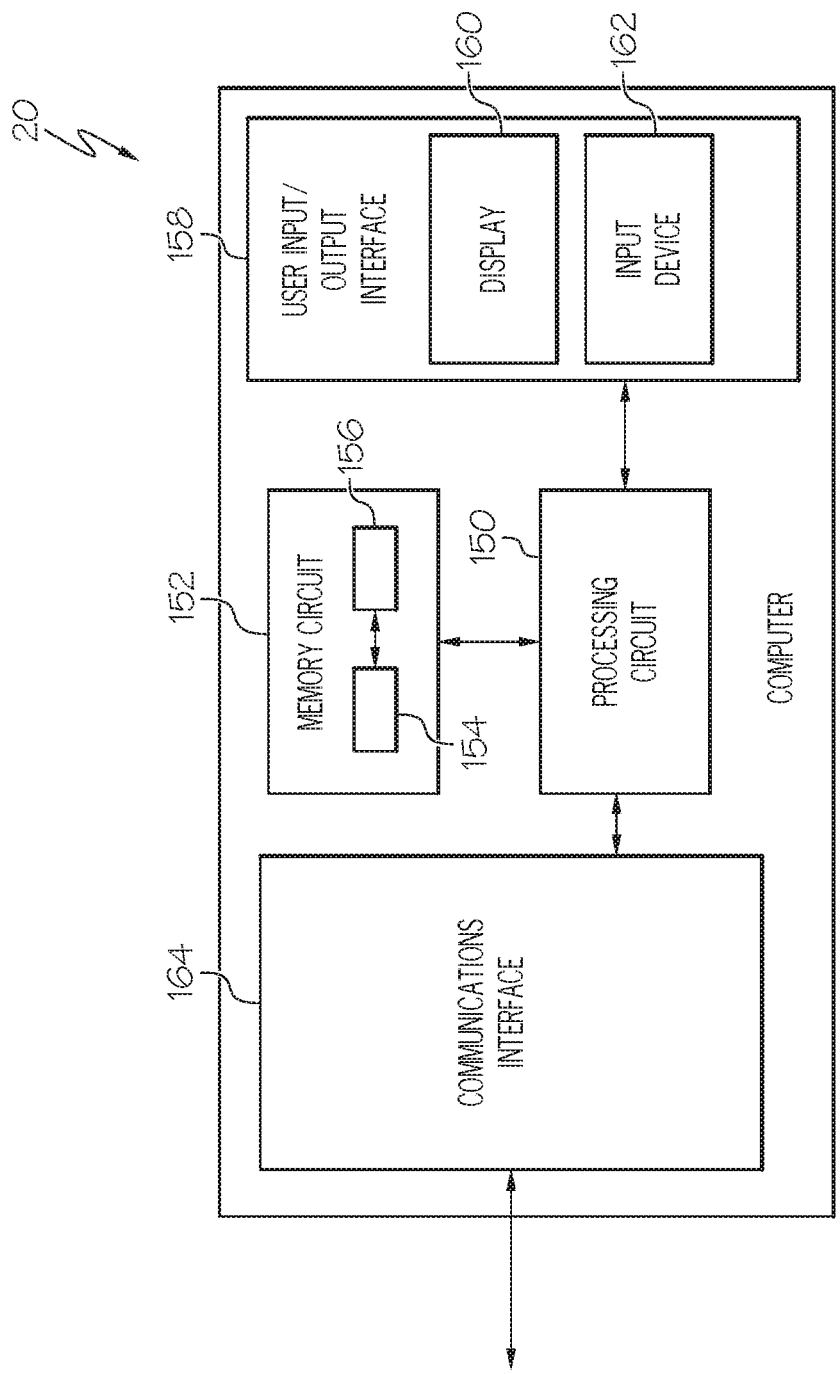
FIG. 7 is a functional block diagram illustrating some of the functional components of a computer configured to perform embodiments of the present disclosure.

FIG. 7 is a functional block diagram illustrating a client computer 20 configured according to one embodiment of the present disclosure. As seen in FIG. 7, client computer 20 comprises a processing circuit 150, a memory circuit 152, user I/O interface 158, and a communications interface circuit 164. Client computer 20 executes with any of the well-known operating systems including, but not limited to, MAC-OS, MICROSOFT WINDOWS, UNIX, or other appropriate operating system, and as stated above, communicates with the AS 30 via network 12.

Processing circuit 150 may be implemented by one or more microprocessors, hardware, firmware, or a combination thereof, and generally controls the operation and functions of the client computer 20 according to the appropriate standards. Such operations and functions include, but are not limited to, communicating with AS 30 as previously described. In this regard, the processing circuit 150 may be configured to the implement logic and instructions 154 stored in memory 152 to perform the embodiments of the present disclosure as previously described.

The memory 152 stores programs and instructions 154 that cause the processing circuit 150 to present a user with GUI 60, and to generate and hierarchically link one or more windows as previously described. In some cases, the memory circuit 152 may store the crash dump data as a file 156. In other cases, however, processing circuit 150 is configured to retrieve the crash dump data file 156 from a remote storage device, such as DB 32.

The user I/O interface 158 provides the components necessary for a user to interact with the client computer 20. Such components include, but are not limited to, a display 160 and one or more input devices (e.g., a keyboard and/or mouse) 162. Particularly, the display 160 allows the user to view the crash dump data in one or more hierarchically related windows on GUI 60, while the input devices 162 facilitate the user's ability to create those windows and to define the hierarchical relationships between those windows. The communications interface circuit 164 comprises a transceiver or other communications interface (e.g., an ETHERNET or other network card) that facilitates the communications with AS 30 via network 12.

The present embodiments may, of course, be carried out in other ways than those specifically set forth herein without departing from essential characteristics of the disclosure. For example, it should be noted that the flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, to blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

Thus, the foregoing description and the accompanying drawings represent non-limiting examples of the methods and apparatus taught herein. As such, the present invention is not limited by the foregoing description and accompanying drawings. Instead, the present invention is limited only by the following claims and their legal equivalents.

What is claimed is:

1. A computer-implemented method, comprising:
   generating a plurality of windows for display to a user, wherein the plurality of windows includes a base window and a first target window, wherein both the base window and the first target window are configured to display a corresponding view of crash dump data, wherein the generating the plurality of windows includes:
      configuring the base window to display the crash dump data beginning from a base address of the crash dump data;
   hierarchically linking the first target window to the base window based on a relationship expression that defines a relationship between memory addresses of the crash dump data displayed in the base window and the first target window, wherein the relationship expression defines an offset between the base address and a first target address of the crash dump data;
   subsequent to the hierarchically linking, updating a view of the crash dump data displayed in the first target window, wherein the updating includes:
      configuring the first target window to display the crash dump data beginning from the first target address; and
   changing the view of the crash dump data displayed in the first target window based on the relationship expression responsive to receiving a navigation command changing the view of the crash dump data displayed in the base window.

2. The computer-implemented method of claim 1, wherein generating the plurality of windows for display to the user includes generating the first target window as a duplicate of the base window.

3. The computer-implemented method of claim 1, wherein, prior to the hierarchically linking, the base window and the first target window are both configured to display the crash dump data beginning from the base address.

4. The computer-implemented method of claim 1, wherein the relationship expression includes a subexpression and defines an offset from a memory address provided in the subexpression.

5. The computer-implemented method of claim 1, wherein the relationship expression identifies a context memory address as being a last memory address evaluated in the relationship expression.

6. The computer-implemented method of claim 1, wherein the relationship expression identifies a bookmark that defines a selected memory address of the crash dump data.

7. The computer-implemented method of claim 1, wherein hierarchically linking the first target window to the base window comprises:
   determining the first target address based on the relationship expression; and
   hierarchically linking the first target address to the base address according to the relationship expression.

8. The computer-implemented method of claim 1, wherein the changing the view of the crash dump data displayed in the first target window responsive to receiving the navigation command changing the view of the crash dump data displayed in the base window comprises:
  modifying the first target address in accordance with the relationship expression to determine a modified first target address; and
  displaying the crash dump data in the first target window beginning from the modified first target address.

9. The computer-implemented method of claim 8, wherein modifying the first target address comprises incrementing or decrementing the first target address by an amount defined by the relationship expression.

10. The computer-implemented method of claim 1, wherein the relationship expression comprises a first relationship expression, and wherein the computer-implemented method further comprises:
  generating a second target window for display to the user, wherein the second target window is configured to display a corresponding view of the crash dump data; and
  hierarchically linking the second target window to a selected one of the base window and the first target window based on a second relationship expression linking a second target address of the crash dump data displayed in the second target window to one of the base address and the first target address.

11. The computer-implemented method of claim 10, further comprising:
  changing the view of the crash dump data displayed in the second target window in accordance with the second relationship expression, and responsive to receiving navigation commands changing the view of the crash dump data displayed at the selected one of the base window and the first target window.

12. A computer device, comprising:
  a communications interface circuit configured to communicate data with a communications network;
  a processing circuit; and
  a non-transitory, computer-readable medium having instructions stored thereon that are executable by the processing circuit to cause the computer device to:
    generate a plurality of windows for display to a user, wherein the plurality of windows includes a base window and a first target window, wherein both the base window and the first target window are configured to display a corresponding view of crash dump data, wherein generating the plurality of windows includes:
      configuring the base window to display the crash dump data beginning from a base address of the crash dump data;
      hierarchically link the first target window to the base window based on a relationship expression that defines a relationship between memory addresses of the crash dump data displayed in the base window and the first target window, wherein the relationship expression defines an offset between the base address and a first target address of the crash dump data;
      subsequent to the hierarchically linking, update a view of the crash dump data displayed in the first target window, wherein the updating includes:
        configuring the first target window to display the crash dump data beginning from the first target address; and
        change the view of the crash dump data displayed in the first target window based on the relationship expression responsive to receiving a navigation command changing the view of the crash dump data displayed in the base window.

13. The computer device of claim 12, wherein to hierarchically link the first target window to the base window, the instructions are further executable to cause the computer device to determine the first target address based on the relationship expression.

14. The computer device of claim 12, wherein to change the view of the crash dump data displayed in the first target window responsive to receiving the navigation command, the instructions are further executable to cause the computer device to:
  modify the first target address based on the relationship expression to determine a modified first target address; and
  display the crash dump data in the first target window beginning from the modified first target address.

15. The computer device of claim 14, wherein to modify the first target address, the instructions are further executable to cause the computer device to increment or decrement the first target address by an amount defined by the relationship expression.

16. The computer device of claim 12, wherein the relationship expression comprises a first relationship expression, and wherein the instructions are further executable to cause the computer device to:
  generate a second target window for display to the user, wherein the second target window is configured to display a corresponding view of the crash dump data;
  hierarchically link the second target window to a selected one of the base window and the first target window based on a second relationship expression linking a second target address of the crash dump data displayed in the second target window to one of the base address and the first target address; and
  responsive to receiving navigation commands to change the view of the crash dump data displayed in one of the base window and the first target window, change the view of the crash dump data displayed in the second target window based on the second relationship expression.

17. A non-transitory, computer-readable medium having instructions stored thereon that are executable by a computer device to perform operations comprising:
  generate a plurality of windows for display to a user, wherein the plurality of windows includes a base window and a first target window, wherein both the base window and the first target window are configured to display a corresponding view of crash dump data, wherein the generating the plurality of windows includes:
    configuring the base window to display the crash dump data beginning from a base address of the crash dump data;
    hierarchically link the first target window to the base window based on a relationship expression that defines a relationship between memory addresses of the crash dump data displayed in the base window and the first target window, wherein the relationship expression defines an offset between the base address and a first target address of the crash dump data;
    subsequent to the hierarchically linking, update a view of the crash dump data displayed in the first target window, wherein the updating includes:

configuring the first target window to display the crash dump data beginning from the first target address; and change the view of the crash dump data displayed in the first target window based on the relationship expression responsive to receiving a navigation command changing the view of the crash dump data displayed in the base window.

* * * * *